United States Patent
Zhang et al.

(10) Patent No.: US 10,450,098 B2
(45) Date of Patent: Oct. 22, 2019

(54) SYNERGISTIC COLD STERILIZING AND PRESERVING METHOD FOR FRESH MEAT WITH HIGH VOLTAGE ELECTRIC FIELD PLASMA AND NANO PHOTOCATALYSIS

(71) Applicant: NANJING AGRICULTURAL UNIVERSITY, Nanjing, Jiangsu (CN)

(72) Inventors: Jianhao Zhang, Nanjing (CN); Jiamei Wang, Nanjing (CN); Hong Zhuang, Nanjing (CN)

(73) Assignee: NANJING AGRICULTURAL UNIVERSITY, Nanjing (CN)

( * ) Notice: Subject to any disclaimer, the term of this patent is extended or adjusted under 35 U.S.C. 154(b) by 130 days.

(21) Appl. No.: 15/305,727

(22) PCT Filed: Oct. 21, 2014

(86) PCT No.: PCT/CN2014/089001
§ 371 (c)(1),
(2) Date: Oct. 21, 2016

(87) PCT Pub. No.: WO2016/008225
PCT Pub. Date: Jan. 21, 2016

(65) Prior Publication Data
US 2017/0043895 A1    Feb. 16, 2017

(30) Foreign Application Priority Data
Jul. 18, 2014  (CN) .......................... 2014 1 0347682

(51) Int. Cl.
*B65B 55/12*   (2006.01)
*A23B 4/00*   (2006.01)

(52) U.S. Cl.
CPC .............. *B65B 55/12* (2013.01); *A23B 4/00* (2013.01); *A23V 2002/00* (2013.01)

(58) Field of Classification Search
CPC ... B30B 15/288; F16F 2230/24; F16F 9/0218; A23B 4/00; A23V 2002/00; B65B 55/12
See application file for complete search history.

(56) References Cited

U.S. PATENT DOCUMENTS 4,140,962 A * 2/1979 Quinn ................ G03G 15/0283
                                                                   323/293
5,468,507 A * 11/1995 Czap ...................... A23D 9/007
                                                                   106/244
(Continued)

FOREIGN PATENT DOCUMENTS

CN       1539874 A      10/2004
CN       1558169 A      12/2004
(Continued)

OTHER PUBLICATIONS

Mar. 11, 2015 International Search Report issued in International Patent Application No. PCT/CN2014/089001.

*Primary Examiner* — Michele L Jacobson
*Assistant Examiner* — Preston Smith
(74) *Attorney, Agent, or Firm* — Oliff PLC

(57) ABSTRACT

Disclosed is a synergistic sterilizing and preserving method for fresh meat with high voltage electric field plasma and nano photocatalysis, which belongs to the technical field of cold sterilization of food package. The method comprises the steps: uniformly mixing a photocatalyst, a coupling agent and coating liquid at a high speed, performing the coupling to obtain modified coating liquid, smearing the coating liquid onto the surface of a plastic packaging film to obtain a packaging material with a photocatalytic bacteriostatic function, packaging fresh meat in an MAP (modified atmosphere packing) manner by adopting the bacteriostatic packaging material, wherein a coating containing the photocatalytic material is disposed at the inner side of a package, placing the packed fresh meat between two electrodes (Continued)

of a plasma generating device, and performing the plasma sterilization under the condition of a high voltage electric field.

5 Claims, 1 Drawing Sheet

(56) References Cited

U.S. PATENT DOCUMENTS

| | | | | |
|---|---|---|---|---|
| 2002/0070202 | A1* | 6/2002 | Jensen | A23L 3/358 219/121.59 |
| 2008/0260578 | A1* | 10/2008 | Engemann | A23L 3/28 422/400 |
| 2010/0104701 | A1* | 4/2010 | Ibe | A23B 4/16 426/129 |
| 2014/0060740 | A1* | 3/2014 | Huang | H01J 37/32082 156/345.44 |

FOREIGN PATENT DOCUMENTS

| | | |
|---|---|---|
| CN | 201091691 Y | 7/2008 |
| CN | 101283832 A | 10/2008 |
| JP | 2009066594 * | 4/2009 |

\* cited by examiner

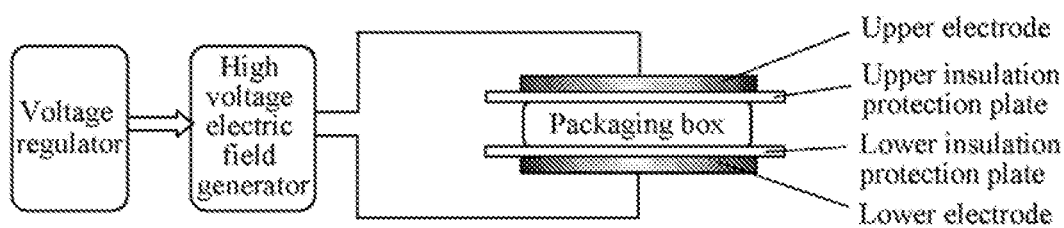

SYNERGISTIC COLD STERILIZING AND PRESERVING METHOD FOR FRESH MEAT WITH HIGH VOLTAGE ELECTRIC FIELD PLASMA AND NANO PHOTOCATALYSIS

TECHNICAL FIELD

The present invention belongs to the technical field of cold sterilization of food package, and in particular relates to a synergistic sterilizing and preserving method for fresh meat with high voltage electric field plasma and nano photocatalysis.

RELATED ART

The preserving packaging is an important technical method for guaranteeing the security and quality of the international fresh livestock and poultry meat logistics process at present. In the USA, there are 80% chicken sold in an oxygen-bearing packaging cold storage way. However, the shelf life of the fresh livestock and poultry meat preserving packaging depends on a sterilization effect in the processing and packaging process. MAP is a conventional fresh meat preserving packaging method in the world at present. Microbes, particularly putrefying bacteria and pathogenic bacteria in the circulation and sales process still are main factors causing the security and quality accident of food.

There are a lot of methods used to sterilize the surface of the fresh meat, but a majority of methods have weaknesses. The processing system needing a high pressure may decrease the perceptual effect, of the fresh meat surface; the ultraviolet illumination processing is poor in effect on sterilizing the surface of the fresh meat, and due to the irregular shape of the surface of the fresh meat, an ultraviolet illumination sterilization blind area may he generated; the high voltage pulse electric field has the limitation on sterilizing the fresh meat, which is reflected on the direct contact of the fresh meat with the electrode in the processing process; and the sterilization way containing a calorie heating process may severely influence the consumption quality of the fresh meat. In view of the weaknesses of the above sterilization method, no sterilization method can be effectively used to sterilize the packaged fresh meat at present. Therefore, a method which can be used to coldly sterilize the packaged fresh meat and can maintain the perceptual quality and security of the product is an important breakthrough of the fresh food preserving packaging technology and can promote the development of the security and quality control technology of the fresh food logistics preserving packaging.

SUMMARY

The objective of the present invention is to provide a synergistic sterilizing and preserving method for fresh meat with high voltage electric field plasma and nano photocatalysis for the above technical problems. According to the method, a high voltage electric field is used to generate plasma so as to implement the cold sterilization and preservation on the MAP packaged fresh meat under the synergism of the photocatalysis of a nano material thereby avoiding the microbe secondary pollution of the packaged product, providing a safety and high-efficiency cold sterilization preserving method which can effectively prolong a preserving period of the shelf life to the fresh livestock and poultry meat MAP packaged products.

The objective of the present invention can be realized through the following technical solution:

A synergistic sterilizing and preserving method for fresh meat with high voltage electric field plasma and nano photocatalysis comprises the following steps;

(1) preparing a bacteriostatic packaging material: uniformly mixing a photocatalyst, a coupling agent and coating liquid at a high speed, performing the coupling to obtain modified coating liquid, smearing the modified coating liquid onto the surface of a plastic packaging film, thereby preparing a packaging material with a photocatalytic bacteriostatic function;

(2) packaging fresh meat in an MAP manner by adopting the packaging material prepared in the step (1), wherein a coating containing the photocatalytic material is disposed at the inner side of the package; and (3) placing the MAP packaged fresh meat between, two electrodes of a plasma generating device, and performing the plasma sterilization under the condition of a high voltage electric field.

In the technical solution of the present invention: the material of the plastic packaging film in the step (1) is polyamide, polypropylene, polyethylene, polyvinyl, chloride or polyester, and preferably is polyamide; the coating liquid is PVA coating liquid, PE coating liquid or PVDC coating liquid, and the mass concentration of the coating liquid is 2-8%; and the photocatalyst is at least one of nano $TiO_2$, nano ZnO or Nano $Fe_2O_3$, the consumption of the photocatalyst is 0.3-2 g/L coating liquid, and the consumption of the photocatalyst is preferably 0.45-0.65 g/L coating liquid.

In the technical solution of the present invention: the gas introduced in the MAP packaging process in the step (2) is at least one of carbon dioxide, oxygen, nitrogen, helium, neon and argon.

In the technical solution of the present invention: the plasma generating device in the step (3) comprises a voltage regulator, a high voltage electric field generator, an upper electrode, a lower electrode and an insulation protection plate, wherein the MAP packaged fresh food is placed between the upper electrode and the lower electrode; an upper insulation protection plate is arranged between the upper surface of a packaging box and the upper electrode, and a lower insulation protection plate is arranged between, the lower surface of the packaging box and the lower electrode; the adopted insulation protection plate is a polypropylene or polyethylene plate, the thickness of the upper protection plate is 1.3-1.8 mm, and the thickness of the lower protection plate is 1.8-3.5 mm; the voltage strength of the plasma generating device is 10-50 kv/cm, and the processing time is 1 s-6 min; the voltage strength is preferably 25-35 kv/cm, and the processing time is preferably 30-90 s; and in another technical solution, the voltage strength is preferably 25-35 kv/cm, and the plasma processing time is preferably 60-180 s.

In the technical solution of the present invention, the technical solution adopted to smear the modified coating liquid onto the surface of the plastic packaging film is not specifically illustrated, and in a preferable technical solution, a coating machine is utilized to uniformly smear a thin layer of modified coating liquid on the surface of the plastic packaging film and then to utilize a spread roll when a dry-type compounding machine is used for coating, so that the coating is more uniform. Finally the plastic packaging film is arranged in a curing chamber at 40° C. to 50° C. for 5 to 6 hours, thereby effectively increasing the adhesive force.

The coupling agent adopted in the technical solution of the present invention is not specifically illustrated and includes but is not limited to the coupling agent 570 or the coupling agent 550, and the consumption of the coupling agent is 10-15 mg/100 g coating liquid.

The coating amount of the modified coating liquid on the surface of the plastic packaging film is not specifically illustrated in the technical solution of the present invention and is preferably 0.3-5 g/m$^2$.

In the technical solution of the present invention, the consumption of the photocatalyst is 0.3-2 g/L coating liquid, i.e., the addition amount of the catalyst per liter of coating liquid is 0.3-2 g.

In the technical solution of the present invention, the consumption of the coupling agent is 10-15 mg/100 g coating liquid, i.e., the consumption of the coupling agent for every 100 g of coating liquid is 10-15 mg.

The present invention has the beneficial effects as follows:

(1) A double-layer medium barrier system is adopted as a plasma generating system to process the MAP packaged fresh meat, the high voltage electric field electrodes for generating the plasma ate arranged outside the product package, and the plasma is generated inside the package, thereby comprehensively acting on the product and microbes inside the package, avoiding the influence of the external environment, and also avoiding the secondary pollution on the product.

(2) Nano metal oxide is used as the photocatalytic material, and ultraviolet light generated inside the package during the plasma generation process of the high voltage electric field is used to realize the nano photocatalytic sterilization effect and is synergistic with the plasma to sterilize microbes inside the package.

(3) Oxygen, carbon dioxide, nitrogen and vapor inside the MAP package are used as medium gas for generating the plasma, and ozone, active oxygen free radicals and ultraviolet light generated in the package are synergistic with the nano photocatalytic sterilization, so that the sterilization effect is good, and no residue and no toxic byproducts are produced, thereby avoiding the security problem caused by adopting a chemical sterilizer, (4) The synergistic, sterilizing and preserving method for fresh meat with high voltage electric field plasma and nano photocatalysis is carried out under the normal temperature and normal pressure, is short in processing time, and does not generate heat and cause the temperature variation inside the package, thereby being a high-efficiency cold sterilization technology, and particularly suitable for the preserving packaging of the fresh meat.

BRIEF DESCRIPTION OF THE DRAWINGS

FIG. 1 is a high voltage electric field plasma generating system.

DETAILED DESCRIPTION

The present invention is further described below in conjunction with embodiments, but the protection scope of the present invention is not limited, as follows:

The high voltage electric field plasma generating system used in embodiments of the present invention is as shown in FIG. 1; the device comprises a voltage regulator, a high voltage electric field generator, an upper electrode, a lower electrode and an insulation protection plate, wherein the MAP packaged fresh food is placed between the upper electrode and the lower electrode; an upper insulation protection plate is arranged between the upper surface of a packaging box and the upper electrode, and a lower insulation protection plate is arranged between the lower surface of the packaging box and the lower electrode; and the adopted insulation protection plate is a polypropylene or polyethylene plate, the thickness of the upper protection plate is 1.3-1.8 mm, and the thickness of the lower protection plate is 1.8-3.5 mm.

Samples adopted in embodiments 1-4 and a reference example 1 are fresh chicken fillet; the fresh chicken fillet is randomly selected from a chicken segmentation production line of a production workshop of a slaughter factory and is transported back to a laboratory in an ice box; the surface of the chicken is removed to reserve the middle sterile portion, and the weight of the chicken fillet is kept approximately at 95±5 g; and bacteria such as *M. caseolyticus* and *P. fluorescens* with a known concentration are inoculated to the surface of the chicken.

The coating amount of the modified coating liquid on the surface of the plastic packaging film in embodiments 1-4 is 0.3-5 g/m$^2$.

Embodiment 1

First, PVA particles are heated and then dissolved in 100 ml distilled water to obtain the PVA coating liquid with the mass concentration of 4.3%; then nano $TiO_2$ and the coupling agent 570 are added into the PVA coating liquid and are sufficiently stirred to prepare homogeneous suspension, thereby obtaining the modified coating liquid, wherein the consumption of nano $TiO_2$ is 0.5 g/L coating liquid, and the consumption of the coupling agent 570 is 10 mg/100 g coating liquid; and finally the modified coating liquid is smeared onto the polyamide (PA) plastic film and is dried to form a film, thereby obtaining the bacteriostatic packaging material.

The preprocessed chicken is placed into a food packaging container and is packaged in an MAP manner by utilizing the bacteriostatic packaging material, the coating containing the photocatalytic material is disposed at the inner side of the package, the introduced gas in the packaging process is oxygen and Ar (the volume ratio is 1:1), the packaged packaging box is arranged between the electrodes so as to be processed by plasma, the plasma processing time is 60 s, and the processing voltage strength is 30 kv/cm.

Embodiment 2

First, PVA particles are heated and then dissolved in 100 ml distilled water to obtain the PVA coating liquid with the mass concentration of 3.5%; then nano ZnO and the coupling agent 570 are added into the coating liquid and are sufficiently stirred to prepare homogeneous suspension, thereby obtaining the modified coating liquid, wherein the consumption of nano ZnO is 0.5 g/L coating liquid, and the consumption of the coupling agent 570 is 11 mg/100 g coating liquid; and finally the modified coating liquid is smeared onto the polyamide (PA) plastic film and is dried to form a film, thereby obtaining the bacteriostatic packaging material. The preprocessed chicken is placed into a food packaging container and is packaged in an MAP manner by utilizing the bacteriostatic packaging material, the coating containing the photocatalytic material is disposed at the inner side of the package, the introduced gas in the packaging process is $N_2$ and $O_2$ (the volume ratio is 1:1), the packaged packaging box is arranged between the electrodes so as to be processed by plasma, the plasma processing time is 120 s, and the processing voltage strength is 30 kv/cm.

Embodiment 3

First, PVDC particles are heated and then dissolved in 100 ml distilled water to obtain the PVDC coating liquid with the mass concentration of 5.8%; then nano $Fe_2O_3$ and the coupling agent 570 are added into the coating liquid and are sufficiently stirred to prepare homogeneous suspension, thereby obtaining the modified coating liquid, wherein the consumption of nano $Fe_2O_3$ is 0.5 g/L coating liquid, and the consumption of the coupling agent 570 is 12 mg/100 g coating liquid; and finally the modified coating liquid is smeared onto the polyamide (PA) plastic film and is dried to form a film, thereby obtaining the bacteriostatic packaging material.

The preprocessed chicken is placed into a food packaging container and is packaged in an MAP manner by utilizing the bacteriostatic packaging material, the coating containing the photocatalytic material is disposed at the inner side of the package, the introduced gas in the packaging process is $CO_2$ and $N_2$ (the volume ratio is 1:1), the packaged packaging box is arranged between the electrodes so as to he processed by plasma, the plasma processing time is 180 s, and the processing voltage strength is 30 kv/cm.

Embodiment 4

First, PVA particles are heated and then, dissolved in 100 ml distilled water to obtain the PVA coating liquid with the mass concentration of 3.5%; then nano $Fe_2O_3$, nano ZnO and the coupling agent 570 are added, into the PVA coating liquid and are sufficiently stirred to prepare homogeneous suspension, thereby obtaining the modified coating liquid, wherein the consumption of nano $Fe_2O_3$ is 0.3 g/L coating liquid, the consumption of the nano ZnO is 0.3 g/L coating liquid, and the consumption of the coupling agent 570 is 10 mg/100 g coating liquid; and finally the modified coating liquid is smeared onto the polyamide (PA) plastic film and is dried to form a film, thereby obtaining the bacteriostatic packaging material.

The preprocessed chicken is placed into a food packaging container and is packaged in an MAP manner by utilizing the bacteriostatic packaging material the coating containing the photocatalytic material is disposed at the inner side of the package, the introduced gas in the packaging process is a mixture of $O_2$, $CO_2$ and $N_2$ (the volume ratio is 1:1:1), the packaged packaging box is arranged between the electrodes so as to be processed by plasma, the plasma processing time is 120 s, and the processing voltage strength is 30 kv/cm.

Reference Example 1

The condition of the embodiment is the same with that of embodiment 1, and only the bacteriostatic packaging material is replaced with an ordinary polyamide (PA)/polyethylene film.

cultured at a table concentrator until an appropriate concentration is achieved, and after the culture medium is removed, sterile PBS is used to prepare the bacterial suspension for standby application. Before the samples in embodiments 1-5 and reference example 1 are sterilized, the content of *P. fluorescens* strain is 6.15±0.41 log, and the content of the *M. caseolyticus* strain is 6.39±0.32 log. After the samples in embodiments 1-4 and reference example 1 are sterilized by plasma, the content of the strain is as shown in table 1.

TABLE 1

Variation of Quantity of Bacterial Colonies on the Surface of Plasma Processed Chicken

| Item | *P. fluorescens* (log) | *M. caseolyticus* (log) |
| --- | --- | --- |
| Embodiment 1 | 2.66 ± 0.14 | 3.0 ± 0 |
| Embodiment 2 | 3.06 ± 0.35 | 3.36 ± 0.21 |
| Embodiment 3 | 3.34 ± 2.81 | 3.75 ± 0.28 |
| Embodiment 4 | 3.75 ± 0.42 | 4.0 ± 0.32 |
| Reference example 1 | 5.15 ± 0.35 | 5.50 ± 0.01 |

It can be seen from table 1 that after the plasma processing, the quantity of the bacterial colonies of *M. caseolyticus* and *P. fluorescens* in the novel homemade bacteriostatic nano material film packaging group is far smaller than that in an ordinary film packaging group.

2. Influence of Different Storage Times on the Quantity and Color of the Bacterial Colonies

TABLE 2

Variation of Quantity of Bacterial Colonies on the Surface of Plasma Processed and packed Chicken

| Item | 3 days | 7 days | 10 days | 14 days |
| --- | --- | --- | --- | --- |
| Embodiment 1 | 2.47 ± 0.21 | 3.03 ± 0.18 | 3.46 ± 0.35 | 4.37 ± 0.36 |
| Embodiment 2 | 3.07 ± 0.25 | 3.78 ± 0.22 | 4.63 ± 0.33 | 5.29 ± 0.30 |
| Embodiment 3 | 3.78 ± 0.31 | 4.37 ± 0.28 | 5.48 ± 0.42 | 6.30 ± 0.30 |
| Embodiment 4 | 4.31 ± 0.31 | 4.78 ± 0.28 | 5.64 ± 0.25 | 6.31 ± 0.24 |
| Reference example 1 | 5.39 ± 0.23 | 7.44 ± 0.31 | 7.57 ± 0.33 | 8.36 ± 0.32 |

TABLE 3

Influence on Color Difference L* of the Plasma Processed Packaged Chicken in the Storage Process

| Processing group | | 3 days | 7 days | 10 days | 14 days |
| --- | --- | --- | --- | --- | --- |
| Embodiment 1 | Before the processing | 55.06 ± 2.7 | 56.09 ± 4.98 | 56.64 ± 3.37 | 58.35 ± 5.75 |
| | After the processing | 58.21 ± 2.16 | 55.71 ± 3.51 | 58.29 ± 3.73 | 58.91 ± 4.20 |
| Embodiment 2 | Before the processing | 56.88 ± 3.24 | 59.58 ± 2.8 | 57.43 ± 2.17 | 55.72 ± 3.97 |
| | After the processing | 59.6 ± 2.68 | 59.84 ± 4.63 | 56.19 ± 2.17 | 55.67 ± 2.16 |
| Embodiment 3 | Before the processing | 55.5 ± 3.2 | 58.18 ± 3.36 | 56.88 ± 4.21 | 59.58 ± 4.01 |
| | After the processing | 58.8 ± 2.34 | 58.85 ± 2.98 | 59.34 ± 2.28 | 61.02 ± 2.42 |
| Embodiment 4 | Before the processing | 56.92 ± 4.49 | 58.03 ± 2.84 | 56.56 ± 2.54 | 58.4 ± 3.39 |
| | After the processing | 59.42 ± 4.59 | 59.9 ± 3.02 | 58.22 ± 2.69 | 60.15 ± 3.00 |

Performance Test:

1. Test on Quantity of Bacterial Colonies

*P. fluorescens* and *M. caseolyticus* experimental strains in putrid chicken adopted by the bacterial suspension are After the plasma processing, compared with that in the control group, the quantity of the bacterial colonies on the surface of the packaged chicken is obviously reduced, as shown in table 2. The chicken in the control group can be stored for less than or equal to 7 days at 4° C., the quantity of the bacterial colonies at the seventh day is already more than 7 log, i.e., the chicken has a trend of going bad; and after the chicken is packaged by utilizing the photocatalytic packaging film and processed by the plasma, the chicken can be stored for 14 days at 4° C., thus being twice of the control group. The surface color change of the chicken in the storage process is as shown in table 3. After the chicken is processed by the plasma and then is stored at 4° C., the surface color of the chicken is not changed, it shows that the combination of the plasma and the photocatalytic film can effectively prolong the storage period of the chicken, and the storage period is twice of the chicken packaged by utilizing the ordinary packaging film.

What is claimed is:

1. A synergistic cold sterilizing and preserving method for fresh meat with plasma and nano photocatalysis, comprising:
   (1) preparing a bacteriostatic packaging material having a photocatalytic bacteriostatic function, the preparing of the bacteriostatic packaging material comprising uniformly mixing a photocatalyst, a coupling agent and a coating liquid to form a mixture, performing coupling to obtain a modified coating liquid, and smearing the modified coating liquid onto a surface of a plastic packaging film to form a coating on the surface, wherein the photocatalyst is at least one of nano $TiO_2$, nano ZnO and nano $Fe_2O_3$, wherein an amount of the photocatalyst in the mixture is 0.3-2 g/L of coating liquid and wherein a mass concentration of the coating liquid in the mixture is 2-8%;
   (2) packaging fresh meat in an MAP manner by placing the fresh meat within a package comprised of the bacteriostatic packaging material, and introducing a gas into the package, wherein the gas is at least one of carbon dioxide, oxygen, nitrogen, helium, neon and argon, and wherein the coating is disposed at an inner side of the package; and
   (3) placing the MAP packaged fresh meat between two electrodes of a plasma generating device, and performing plasma sterilization under a condition of an electric field, wherein a voltage strength of the plasma generating device is 10-50 kv/cm, and a processing time is 1 second to 6 minutes.

2. The synergistic cold sterilizing and preserving method for fresh meat with plasma and nano photocatalysis according to claim 1, wherein a material of the plastic packaging film is polyamide, polypropylene, polyethylene or polyester.

3. The synergistic cold sterilizing and preserving method for fresh meat with plasma and nano photocatalysis according to claim 1, wherein the coating liquid is PVA coating liquid, PE coating liquid or PVDC coating liquid.

4. The synergistic cold sterilizing and preserving method for fresh meat with plasma and nano photocatalysis according to claim 1, wherein the plasma generating device comprises a voltage regulator, an electric field generator, an upper electrode, an upper insulation protection plate, a lower electrode and a lower insulation protection plate, wherein the MAP packaged fresh meat is placed between the upper electrode and the lower electrode; the upper insulation protection plate is arranged between an upper surface of a packaging box and the upper electrode, and the lower insulation protection plate is arranged between a lower surface of the packaging box and the lower electrode.

5. The synergistic cold sterilizing and preserving method for fresh meat with plasma and nano photocatalysis according to claim 4, wherein the upper protection plate and the lower insulation protection plate are each a polypropylene or polyethylene plate, a thickness of the upper protection plate is 1.3-1.8 mm, and a thickness of the lower protection plate is 1.8-3.5 mm.

* * * * *